United States Patent
Kondo

(10) Patent No.: US 7,653,289 B1
(45) Date of Patent: Jan. 26, 2010

(54) STREAM CONVERTING METHOD AND APPARATUS THEREOF, AND STREAM RECORDING METHOD AND APPARATUS THEREOF

(75) Inventor: Satoshi Kondo, Yawata (JP)

(73) Assignee: Panasonic Corporation, Osaka (JP)

( * ) Notice: Subject to any disclaimer, the term of this patent is extended or adjusted under 35 U.S.C. 154(b) by 883 days.

(21) Appl. No.: 09/830,920

(22) PCT Filed: Sep. 8, 2000

(86) PCT No.: PCT/JP00/06177

§ 371 (c)(1),
(2), (4) Date: Jul. 31, 2001

(87) PCT Pub. No.: WO01/20826

PCT Pub. Date: Mar. 22, 2001

(30) Foreign Application Priority Data

Sep. 10, 1999   (JP) .................... 11-257016

(51) Int. Cl.
*H04N 7/26* (2006.01)
*H04N 5/91* (2006.01)
(52) U.S. Cl. ............................. 386/124; 386/46
(58) Field of Classification Search ............. 386/124, 386/46, 109, 112, 125; 348/390.1, 411.1; 370/394
See application file for complete search history.

(56) References Cited

U.S. PATENT DOCUMENTS

| 5,835,493 | A | * | 11/1998 | Magee et al. | 370/395.62 |
| 5,953,489 | A | * | 9/1999 | Park | 386/109 |
| 6,148,082 | A | * | 11/2000 | Slattery et al. | 380/212 |
| 6,483,543 | B1 | * | 11/2002 | Zhang et al. | 348/390.1 |
| 6,748,020 | B1 | * | 6/2004 | Eifrig et al. | 375/240.26 |

FOREIGN PATENT DOCUMENTS

| JP | 8-195072 A | 7/1996 |
| JP | 9-284715 A | 10/1997 |
| JP | 10-178614 A | 6/1998 |
| JP | 11-167770 A | 6/1999 |
| JP | 11-225314 A | 8/1999 |
| JP | 2000-311441 A | 11/2000 |

* cited by examiner

*Primary Examiner*—Thai Tran
*Assistant Examiner*—Heather R Jones
(74) *Attorney, Agent, or Firm*—McDermott Will & Emery LLP

(57) ABSTRACT

A packet separating section 103 separates TS packets having a designated PID from a first transport stream TS1 and outputs them as a first TS packet string P1 to a bit-rate converting section 104. On the other hand, the other TS packets are output as a second TS packet string P2 to a buffer section 107. The bit-rate converting section 104 converts the bit rate of the first TS packet string P1 for output as a third TS packet string P3. The third TS packet string P3 is re-multiplexed with the second TS packet string P2 by a packet multiplexing section 105, and recorded onto a recording medium.

7 Claims, 7 Drawing Sheets

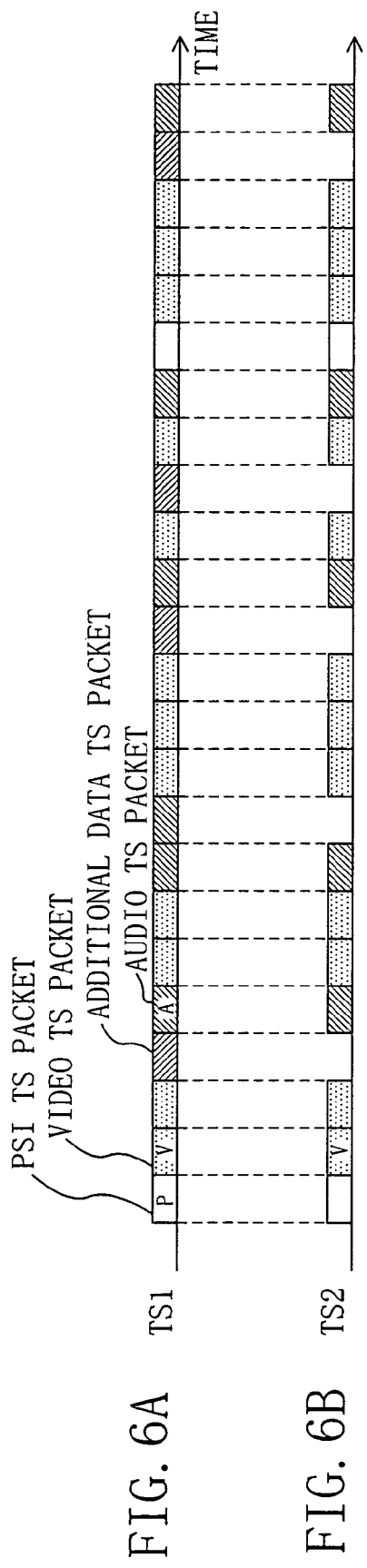

STREAM CONVERTING METHOD AND APPARATUS THEREOF, AND STREAM RECORDING METHOD AND APPARATUS THEREOF

TECHNICAL FIELD

The present invention relates to technology for converting the bit rate of a digital stream supplied from digital broadcasting, a digital interface or the like, and technology for recording the digital stream having the rate converted onto a medium.

BACKGROUND ART

Recently, digital broadcasting has started in satellite broadcasting and terrestrial broadcasting. In the digital broadcasting, data such as compressed, encoded video data (picture data), audio data (sound data) and other management data corresponding to a plurality of channels are generally multiplexed for transmission. The video data and audio data are generally compressed and encoded according to the MPEG1 or MPEG2 method. An MPEG2 transport stream (TS: Transport Stream; hereinafter, simply referred to as "TS" as appropriate) is generally used for multiplexing. A standard for transmitting such a transport stream from a set-top box to another equipment through a digital interface such as IEEE1394 has also been determined.

FIG. 7 is a diagram showing a general structure of the transport stream. As shown in FIG. 7, a transport stream is formed from 188-byte packets (TS packets). Each TS packet is divided into a header portion and a data portion. The header portion includes reference time information called PCR (Program Clock Reference) and the like. On the other hand, the data portion includes one type of data out of general data such as video data, audio data, program specific information (PSI) data and additional data.

As shown in FIG. 7(a), a bitstream of the video data, audio data or additional data is called an elementary stream. The elementary stream is packetized by a prescribed unit into PES (Packetized Elementary Stream) packets. The PES packet is formed from a PES packet header and PES packet data that forms a part of the elementary stream. The PES packet header includes decoding time (DTS), display time (PTS) and the like of the elementary stream. The PES packet is packetized by a prescribed unit into TS packets each having a TS packet header added thereto.

On the other hand, as shown in FIG. 7(b), the program specific information data is called a PSI section. The PSI section is formed from a PSI section header and a PSI table. The PSI section is packetized by a prescribed unit into TS packets each having a TS packet header added thereto.

It is possible to reproduce synchronized picture, audio and the like by decoding the transport stream as shown in FIG. 7 with reference to the header information and management data in the order of arrival.

An apparatus for recording such a transport stream onto a magnetic tape is disclosed in Japanese Laid-Open Publication No. 8-273305. The transport stream cannot be recorded on an analog video tape recorder and the like.

Therefore, the aforementioned publication proposes a method for recording on the magnetic tape an input transport stream or a stream corresponding to a single channel that is selected from the transport stream.

Problems

However, the prior art has the following problems.

The aforementioned method directly records an input transport stream or a stream corresponding to a single channel that is selected from the transport stream. Since a magnetic tape generally has a very large capacity, long recording time can be ensured even if the stream is thus directly recorded thereon.

However, a recording medium having a smaller capacity than that of the magnetic tape, e.g., an optical disk, has very short recording time when the stream is recorded thereon by the aforementioned method, causing a practical problem. For example, a typical high-capacity recording optical disk, DVD-RAM, has a capacity of 2.6 GB. A stream having a bit rate of 6 Mbps can be recorded on the DVD-RAM at most only for about one hour.

On the other hand, in a current analog VTR, recording for two to three hours is possible even in the standard mode. A movie, a sports program and the like normally last for about two hours. In view of the above, a recording optical disk such as DVD-RAM may not be utilized very much as a broadcast recording medium when a stream is recorded thereon using the conventional method.

DISCLOSURE OF THE INVENTION

It is an object of the present invention to enable, with a simple structure, a stream of digital broadcasting to be recorded for a long time even on a small-capacity medium.

More specifically, according to the present invention, a stream converting method includes the steps of: separating a first transport stream (TS) into a first TS packet string formed from TS packets that have a prescribed packet identifier and a second TS packet string formed from TS packets that do not have the prescribed packet identifier; converting a bit rate of the first TS packet string so as to produce a third TS packet string; and multiplexing the produced third TS packet string and the second TS packet string so as to produce a second transport stream.

Preferably, the stream converting method according to the present invention includes the steps of: extracting reference time information from the first transport stream so as to produce reference time from the reference time information; determining, with reference to the reference time, time of receipt of a TS packet including a head byte of a PES packet in the first TS packet string as first time of receipt; determining, with reference to the reference time, time of receipt of a head byte of each TS packet forming the second TS packet string as second time of receipt; and delaying the reference time by a prescribed time so as to produce delayed reference time, and the packet multiplexing step includes the steps of selecting from the third TS packet string a TS packet corresponding to the first time of receipt for output as the second transport stream, when the delayed reference time matches the first time of receipt, and selecting from the second TS packet string a TS packet corresponding to the second time of receipt for output as the second transport stream, when the delayed reference time matches the second time of receipt.

More specifically, according to the present invention, a stream recording method includes the steps of: separating a first transport stream into a first TS packet string formed from TS packets that have a prescribed packet identifier and a second TS packet string formed from TS packets that do not have the prescribed packet identifier; converting a bit rate of the first TS packet string so as to produce a third TS packet string; multiplexing the produced third TS packet string and the second TS packet string so as to produce a second transport stream; extracting reference time information from the first transport stream, and delaying reference time represented by the reference time information by a prescribed time so as to produce delayed reference time; and determining, with reference to the delayed reference time, time of receipt of each TS packet forming the second transport stream, and recording the second transport stream together with the determined time of receipt onto a recording medium.

More specifically, according to the present invention, a stream recording method includes the steps of: selecting TS packets other than TS packets having a prescribed packet identifier from a first transport stream so as to output the selected TS packets as a second transport stream; extracting reference time information from the first transport stream so as to produce reference time from the reference time information; and determining, with reference to the reference time, time of receipt of each TS packet forming the second transport stream, and recording the second transport stream together with the determined time of receipt onto a recording medium.

More specifically, according to the present invention, a stream converting apparatus includes: a packet separating section for separating a first transport stream into a first TS packet string formed from TS packets that have a prescribed packet identifier and a second TS packet string formed from TS packets that do not have the prescribed packet identifier; a bit-rate converting section for converting a bit rate of the first TS packet string so as to produce a third TS packet string; and a packet multiplexing section for multiplexing the third TS packet string output from the bit-rate converting section and the second TS packet string output from the packet separating section so as to produce a second transport stream.

More specifically, according to the present invention, a stream recording apparatus includes: a packet separating section for separating a first transport stream into a first TS packet string formed from TS packets that have a prescribed packet identifier and a second TS packet string formed from TS packets that do not have the prescribed packet identifier; a bit-rate converting section for converting a bit rate of the first TS packet string so as to produce a third TS packet string; a packet multiplexing section for multiplexing the third TS packet string output from the bit-rate converting section and the second TS packet string output from the packet separating section so as to produce a second transport stream; a means for extracting reference time information from the first transport stream, and delaying reference time represented by the reference time information by a prescribed time so as to produce delayed reference time; and a recording control section for determining, with reference to the delayed reference time, time of receipt of each TS packet forming the second transport stream, and recording the second transport stream together with the determined time of receipt onto a recording medium.

More specifically, according to the present invention, a stream recording apparatus includes: a packet selecting section for selecting TS packets other than TS packets having a prescribed packet identifier from a first transport stream so as to output the selected TS packets as a second transport stream; a means for extracting reference time information from the first transport stream so as to produce reference time from the reference time information; and a recording control section for determining, with reference to the reference time, time of receipt of each TS packet forming the second transport stream, and recording the second transport stream together with the determined time of receipt onto a recording medium.

BRIEF DESCRIPTION OF THE DRAWINGS

FIG. 3 is a diagram showing the relation between PAT (Program Association Table), PMT (Program Map Table) and a stream of picture, sound and the like.

FIGS. 6A and 6B are schematic diagrams illustrating the operation of a stream recording apparatus shown in FIG. 5.

BEST MODE FOR CARRYING OUT THE INVENTION

First Embodiment

Figure 1:
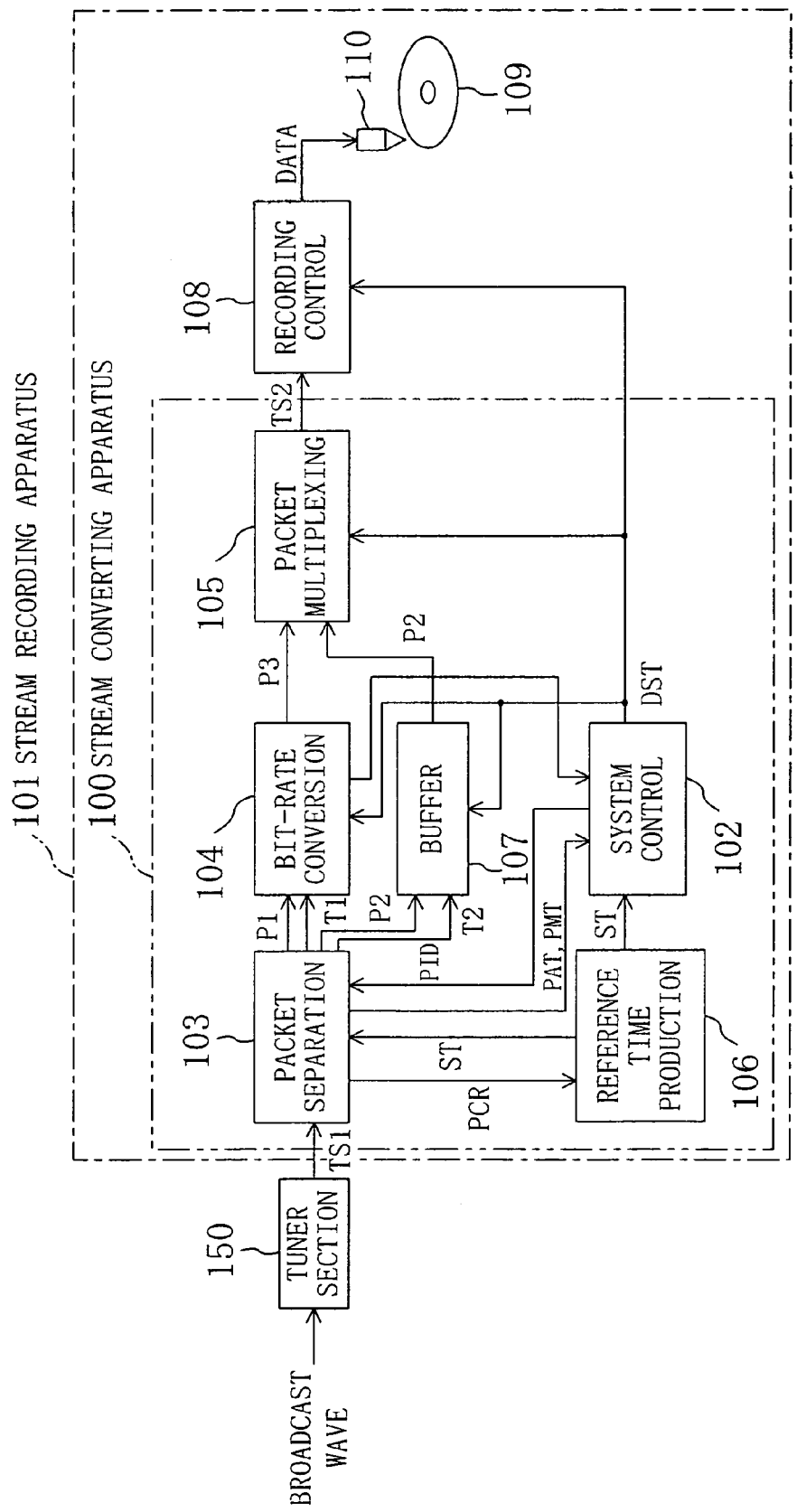
FIG. 1 is a block diagram showing the structure of a stream recording apparatus according to a first embodiment of the present invention.

FIG. 1 is a block diagram showing the structure of a stream recording apparatus according to the first embodiment of the present invention. In FIG. 1, the stream recording apparatus 101 includes a stream converting apparatus 100, a recording control section 108 and an optical head 110, and records an input transport stream (TS) onto an optical disk 109 as a recording medium. The stream converting apparatus 100 converts an input first transport stream TS1 into a second transport stream TS2 by conducting packet separation, bit-rate conversion and packet re-multiplexing.

In the structure of FIG. 1, a tuner section 150 is connected to the input stage of the stream recording apparatus 101. A broadcast wave input to the tuner section 150 via an antenna or the like is subjected to processing in the tuner section 150 such as demodulation of a selected transmission carrier, and is output as a first transport stream TS1.

For simplification of the description, it is herein assumed that only a stream of a single program is included in the first transport stream TS1. A "program" as used herein corresponds to, e.g., a digital broadcast program.

Figure 2:
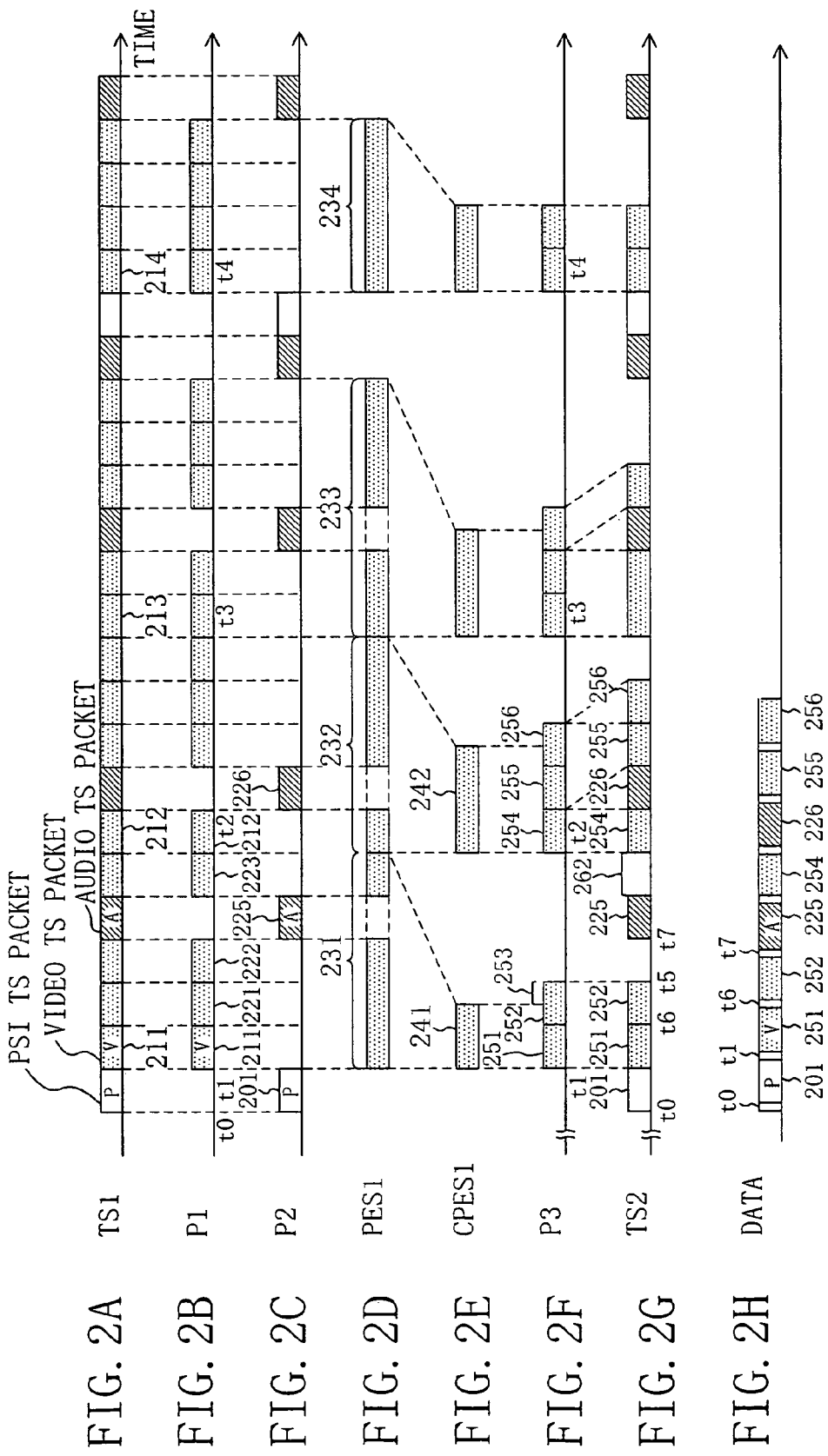
FIGS. 2A-2H are schematic diagrams illustrating the operation of the stream recording apparatus shown in FIG. 1.

FIG. 2 is a schematic diagram illustrating the operation of the stream recording apparatus 101 shown in FIG. 1. Stream conversion and stream recording according to the present embodiment will now be described in conjunction with FIG. 2.

A packet separating section 103 conducts generally three operations. The first operation is to extract PCR (Program Clock Reference) from the header of a TS packet. The PCR is not added to the header of every TS packet, but extracted if any. The extracted PCR as reference time information is output from the packet separating section 103 to a reference time producing section 106.

The reference time producing section 106 produces reference time ST using the PCR received from the packet separating section 103. In the MPEG2-TS, the PCR is indicated by a value having its minimum unit corresponding to one clock of 27-MHz clocks. Accordingly, the reference time producing section 106 produces 27-MHz clocks by a PLL, and counts the clocks using the PCR value, thereby producing the reference time ST. The reference time ST thus produced is output to the packet separating section 103 and a system control section 102. The reference time ST input to the system control section 102 is delayed at least by a processing time required in a bit-rate converting section 104, and is then output as delayed reference time DST to the bit-rate converting section 104, a buffer section 107 and a packet multiplexing section 105.

The second operation of the packet separating section 103 is to obtain a PAT (Program Association Table) and a PMT (Program Map Table) from the information of a program specific information (Program Specific Information: PSI) TS packet included in the first transport stream TS1. The PAT and PMT thus obtained are output from the packet separating section 103 to the system control section 102.

The PAT and PMT are tables indicating the structure of each program multiplexed in a transport stream, and are essential for selection of a program on the receiving side. Since the picture, sound and data of a plurality of programs are multiplexed in a single MPEG-TS, the receiving side must search for desired picture, sound or the like therefrom. In the MPEG-TS, an identifier called a PID (Packet Identification) is written to a packet header of each transport packet. However, the value of each PID is not notified in advance to the receiving side, but instead, a program number is given by an EPG (Electric Program Guide) or the like. The PAT and PMT are intended to implement a scheme for finding the PID from the program number.

Figure 3:
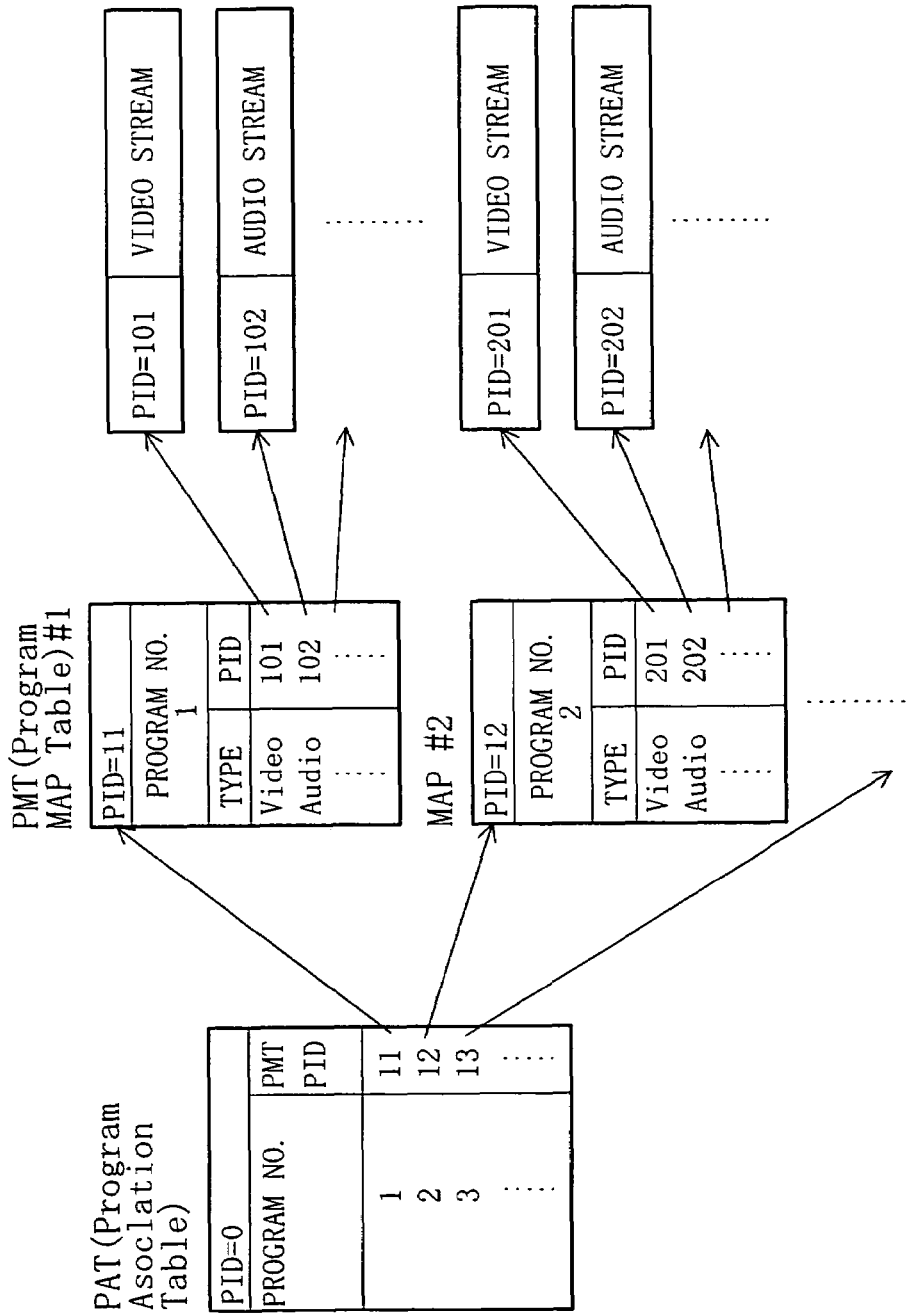

FIG. 3 is a diagram showing the relation between the PAT, PMT and a stream of picture, sound and the like. The PMT has a table of, e.g., a stream of picture, sound and the like included in each program (actually, a table of the PIDS). Only information of a single program is written in each PMT, and the PMTs corresponding to the number of programs are present in a single transport stream. In summary, the PAT is a table of the PMTs, and has a table of the program numbers and the PIDs of the corresponding PMTs themselves. Only one sequence is present in a single transport stream.

The third operation of the packet separating section 103 is to separate the packets of the input first transport stream TS1. More specifically, the first transport stream TS1 is separated into a first TS packet string P1 formed from TS packets that have a prescribed packet identifier, and a second TS packet string P2 formed from TS packets that do not have the prescribed packet identifier.

It is herein assumed that video data is separated from the first transport stream TS1. It is also assumed that the video data has been packetized such that the data corresponding to a single frame forms a single PES packet.

FIGS. 2(a) to (c) show the state of the packet separation as conducted herein. In the figures, (a) shows the first transport stream TS1, (b) shows the first TS packet string P1, and (c) shows the second TS packet string P2. In FIGS. 2(a) to (c), the abscissa indicates time, which herein refers to the reference time ST produced by the reference time producing section 106. Each rectangle represents a single TS packet, wherein a rectangle denoted with "P" represents a program specific information (PSI) TS packet, a rectangle with "V" represents a video TS packet, and a rectangle with "A" represents an audio TS packet. For the other TS packets as well, a TS packet having the same pattern represents a TS packet of the same type.

The system control section 102 obtains a packet identifier (PID) of the video TS packets from the PMT sent from the packet separating section 103. Then, the system control section 102 designates this PID and sends an instruction to the packet separating section 103 to separate the video TS packets from the first transport stream TS1.

In response to the instruction, the packet separating section 103 identifies the video TS packets from the first transport stream TS1 as shown in FIG. 2(a), and outputs the first TS packet string P1 formed from the video TS packets as shown in FIG. 2(b), and the second TS packet string P2 formed from the other TS packets as shown in FIG. 2(c). More specifically, every time the packet separating section 103 finds the header of a TS packet, it checks the PID of that TS packet. If the checked PID matches the PID of the video TS packet, the packet separating section 103 separates that TS packet so as to output the separated TS packets to the bit-rate converting section 104 as the first TS packet string P1. The remaining TS packets are output to the buffer section 107 as the second TS packet string P2.

Upon separating the video TS packets, the bit-rate converting section 104 and the buffer section 107 are notified of the time of receipt of the head byte of each TS packet as first time of receipt T1 and second time of receipt T2, respectively.

Figure 4:
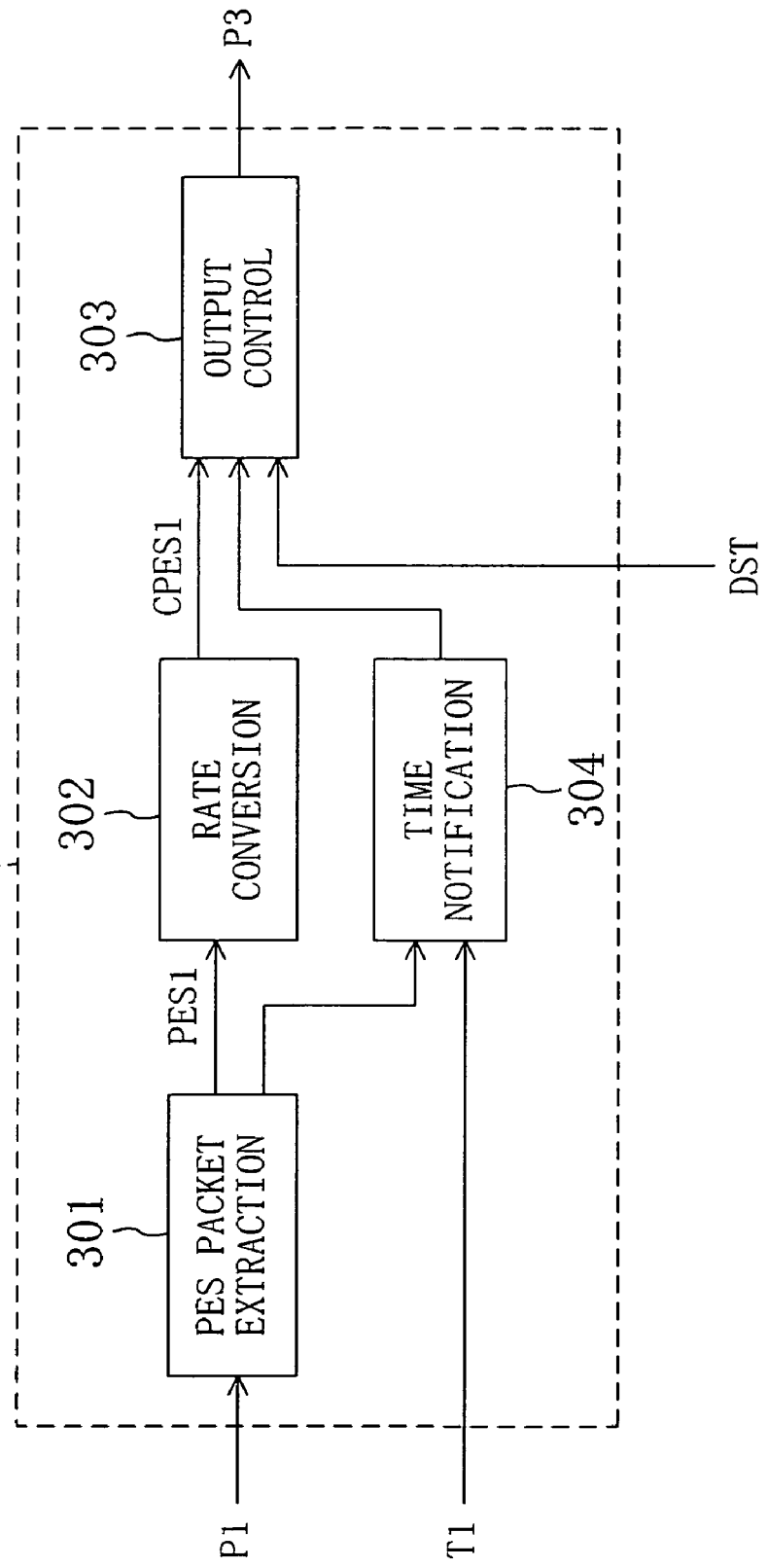
FIG. 4 is a block diagram showing the structure of a bit-rate converting section in the structure of FIG. 1.

The operation of the bit-rate converting section 104 will now be described. FIG. 4 is a block diagram showing the structure of the bit-rate converting section 104. As shown in FIG. 4, the bit-rate converting section 104 includes a PES packet extracting section 301, a rate converting section 302, an output control section 303 and a time notifying section 304.

FIGS. 2(d) to (f) show the state of the bit-rate conversion as conducted herein. It is assumed that, in FIG. 2, video TS packets 211, 212, 213, 214 are TS packets each including the head data of a PES packet. In FIGS. 2(d), (e), the abscissa indicates the data amount rather than time.

The first TS packet string P1 formed from the video TS packets, which is sent from the packet separating section 103, is input to the PES packet extracting section 301. The PES packet extracting section 301 removes the TS packet headers from the first TS packet string P1 and connects the data of a plurality of TS packets together to extract a PES packet PES1. The extracted PES packet PES1 is output to the rate converting section 302. For example, in FIG. 2(d), a video PES packet 231 is produced from the video TS packets 211 and 221 to 223.

In addition, the time notifying section 304 receives as an input the time of receipt T1 of each video TS packet, which is sent from the packet separating section 103. When the PES packet extracting section 301 finds the head data of the PES packet PES1, it notifies the time notifying section 304 thereof. Upon receiving the notification from the PES packet extracting section 301 that the head data of the PES packet PES1 was found, the time notifying section 304 outputs the time of receipt T1 of the video TS packet including that head data to the output control section 303. In the example of FIG. 2, the time at the head of the PES packet 231 is t1, which is output to the output control section 303. Similarly, time t2 as the head time of a PES packet 232, time t3 as the head time of a PES packet 233, and time t4 as the head time of a PES packet 234 are each output to the output control section 303.

The rate converting section 302 converts the bit rate of the video data for the video PES packets PES1 output from the PES packet extracting section 301. The bit-rate converting method includes a method in which a stream is directly subjected to the bit-rate conversion (e.g., high-order components of a frequency conversion coefficient are eliminated), a method in which a stream is once decoded into a video signal for re-encoding, and the like. The rate converting section 302 outputs PES packets CPES1 having the bit rate converted to the output control section 303. It should be noted that, in the case where the decoded video signal is re-encoded in the bit-rate conversion of the rate converting section 302, processing such as re-addition of a PES packet header is required in the rate converting section 302. In FIG. 2(*e*), the PES packet 231 is converted into a PES packet 241 and the PES packet 232 is converted into a PES packet 242.

The output control section 303 receives as inputs the PES packets CPES1 which are output from the rate converting section 302, the respective time of receipt of the head bytes of the PES packets PES1 which is output from the time notifying section 304, and the delayed reference time DST which is sent from the system control section 102. Then, the video PES packet CPES1 is divided into TS packets. This is conducted by dividing the video PES packet CPES1 by a prescribed data length, and adding a TS packet header thereto. For example, as shown in FIG. 2(*f*), the PES packet 241 is divided into TS packets 251, 252, and the PES packet 242 is divided into TS packets 254, 255, 256. Herein, a portion 253 of the TS packet 252 does not have valid data, but is stuffing data. The TS packet 256 also includes stuffing data.

When the time of receipt of the head byte of the PES packet PES1 matches the delayed reference time DST, the TS packets produced from the PES packet CPES1 output from the rate converting section 302 are output to the packet multiplexing section 105 as a third TS packet string P3. For example, if the delayed reference time DST is time t1, the TS packets 251, 252 produced from the PES packet 241 are output, and if the delayed reference time DST is time t2, the TS packets 254, 255, 256 produced from the PES packet 242 are outputs.

On the other hand, the buffer section 107 receives as inputs the second TS packet string P2 formed from the TS packets other than the video TS packets which is output from the packet separating section 103, the time of receipt T2 of each TS packet of the second TS packet string P2 which is output from the packet separating section 103, and the delayed reference time DST which is output from the system control section 102. When the time of receipt T2 of the TS packet received from the packet separating section 103 matches the delayed reference time DST, the TS packet corresponding to that time of receipt is output to the packet multiplexing section 105. In other words, the buffer section 107 outputs the second TS packet string P2 output from the packet separating section 103 with a delay corresponding to the time added to the reference time ST by the system control section 102.

The packet multiplexing section 105 receives as inputs the third TS packet string P3 output from the bit-rate converting section 104 as shown in FIG. 2(*f*), and the second TS packet string P2 output from the buffer section 107 as shown in FIG. 2(*c*). Then, the third TS packet string P3 and the second TS packet string P2 are multiplexed. In this multiplexing, the respective time of the TS packets of the second TS packet string P2 are made to match their respective original time of receipt. Regarding the third TS packet string P3, the time of receipt of a TS packet including the head byte of a video PES packet is made to match the original time of receipt.

For example, as shown in FIG. 2(*g*), a TS packet 201 included in the second TS packet string P2 is multiplexed at the position of the original time of receipt, i.e., time t0, and the TS packet 251 included in the third TS packet string P3 is multiplexed at the position of the time of receipt of the TS packet 211 including the head byte of the original video PES packet 231, i.e., time t1. The TS packet 252 produced from the same PES packet 231 as that of the TS packet 251 is herein multiplexed following the TS packet 251 (time t6). Since there is no TS packet to be multiplexed at the following time t5, this position is empty. Then, a TS packet 225 included in the second TS packet string P2 is multiplexed at the position of time t7, and the subsequent position is again empty.

The TS packet 254, which is located at the head of the TS packets produced from the PES packet 232, is multiplexed at the subsequent position of time t2. Following the TS packet 254, a TS packet 226 included in the second TS packet string P2 is multiplexed preferentially. Since there is no TS packet other than the video TS packets after the TS packet 226, the video TS packets 255, 256 are multiplexed subsequently.

The TS packet string thus produced is output as a second transport stream TS2 from the packet multiplexing section 105 to the recording control section 108.

The recording control section 108 receives as inputs the second transport stream TS2 output from the packet multiplexing section 105 and the delayed reference time DST output from the system control section 102. The recording control section 108 determines the time of receipt of each TS packet forming the second transport stream TS2, and records the second transport stream TS2 together with the determined time of receipt onto the optical disk 109 through the optical head 110. FIG. 2(*h*) shows an example of the data structure of data DATA recorded on the optical disk 109. As shown in FIG. 2(*h*), the empty portion in the second transport stream TS2 is not used, but only the valid TS packets are recorded as the record data DATA.

As described above, in the stream conversion according to the present embodiment, TS packets having a prescribed program identifier (e.g., video TS packets) are extracted from a transport stream received from digital broadcasting or the like, and the TS packet string having the prescribed program identifier is converted into data having a low bit rate. Then, the TS packet string thus converted into the low bit rate is re-multiplexed with the TS packets other than those having the prescribed program identifier. The TS packets having the prescribed program identifier are multiplexed such that the respective start time of the PES packets matches that of the original transport stream, and the TS packets other than those having the prescribed program identifier are multiplexed such that their respective time of receipt matches their original time of receipt. Moreover, in the stream recording according to the present embodiment, the stream-converted TS packet string is recorded onto a recording medium together with the time of receipt of the TS packet string.

Thus, a transport stream of digital broadcasting can be recorded for a long time even on a small-capacity medium, because the transport stream having its bit rate converted into a low bit rate is recorded. Moreover, since the original time information is used for re-multiplexing, stream conversion can be realized with a simple structure. For example, since the reference time is common before and after the stream conversion and the same PCR value can be used, the PCR value can be easily added to the TS packet header, eliminating the need to change the display time (PTS), decoding time (DTS) and the like that are included in the PES packet header. Moreover, since the stream is recorded together with the time of receipt of each TS packet, the TS packet string having the same timing as that upon recording can be output for reproduction.

Note that, although only the bit rate of the video data is converted into a low bit rate in the present embodiment, only the bit rate of the audio data, for example, may be converted into a low bit rate, or the bit rate of both the video data and audio data may be converted into a low bit rate.

Moreover, although only a stream of a single program is included in the transport stream in the present embodiment, a stream of a plurality of programs may be included therein.

Moreover, the bit-rate converting method of the present embodiment may either be fixed-bit-rate encoding or variable-bit-rate encoding.

Moreover, various methods are possible as a method for determining the type of data whose bit rate is to be converted or determining a bit rate in the rate conversion in the present embodiment.

The method for determining the type of data whose bit rate is to be converted includes, as a first example, a method in which only the bit rate of the video data is converted when the difference between the bit rate of an input transport stream and the bit rate to be achieved by conversion is small, and the bit rate of both the video data and audio data is converted when the difference is large. A method for knowing the bit rate of an input transport stream includes a method in which an input bit stream is directly counted, a method using the bit rate information in the bit stream, and the like. In the case where the input transport stream has a variable bit rate, the type of data whose bit rate is to be reduced may either be determined according to its maximum bit rate or according to a change in the bit rate.

As a second example, there is a method for determining according to setting from the user. For example, in the case where the user has determined the video and audio recording quality when setting the recording or the like, the type of data whose bit rate is to be converted is determined according to the determined recording quality. Herein, the bit rate is not converted when the determined recording quality is high, and is converted when the quality is low.

The method for determining the bit rate in the rate conversion includes a method for determining it according to the content of the picture of an input transport stream. For example, for the picture that is hard to encode like sports or music programs, the rate conversion degree is reduced (i.e., the bit rate is not significantly reduced), and for the picture that is easy to encode like news, the rate conversion degree is increased (i.e., the bit rate is significantly reduced). The method for knowing the content of the picture includes a method for searching it from the program content described in the PSI, a method for knowing it by obtaining the degree of difficulty in encoding from the relation between the amount of bits produced and the quantization scale of a video stream, and the like.

Second Embodiment

Figure 5:
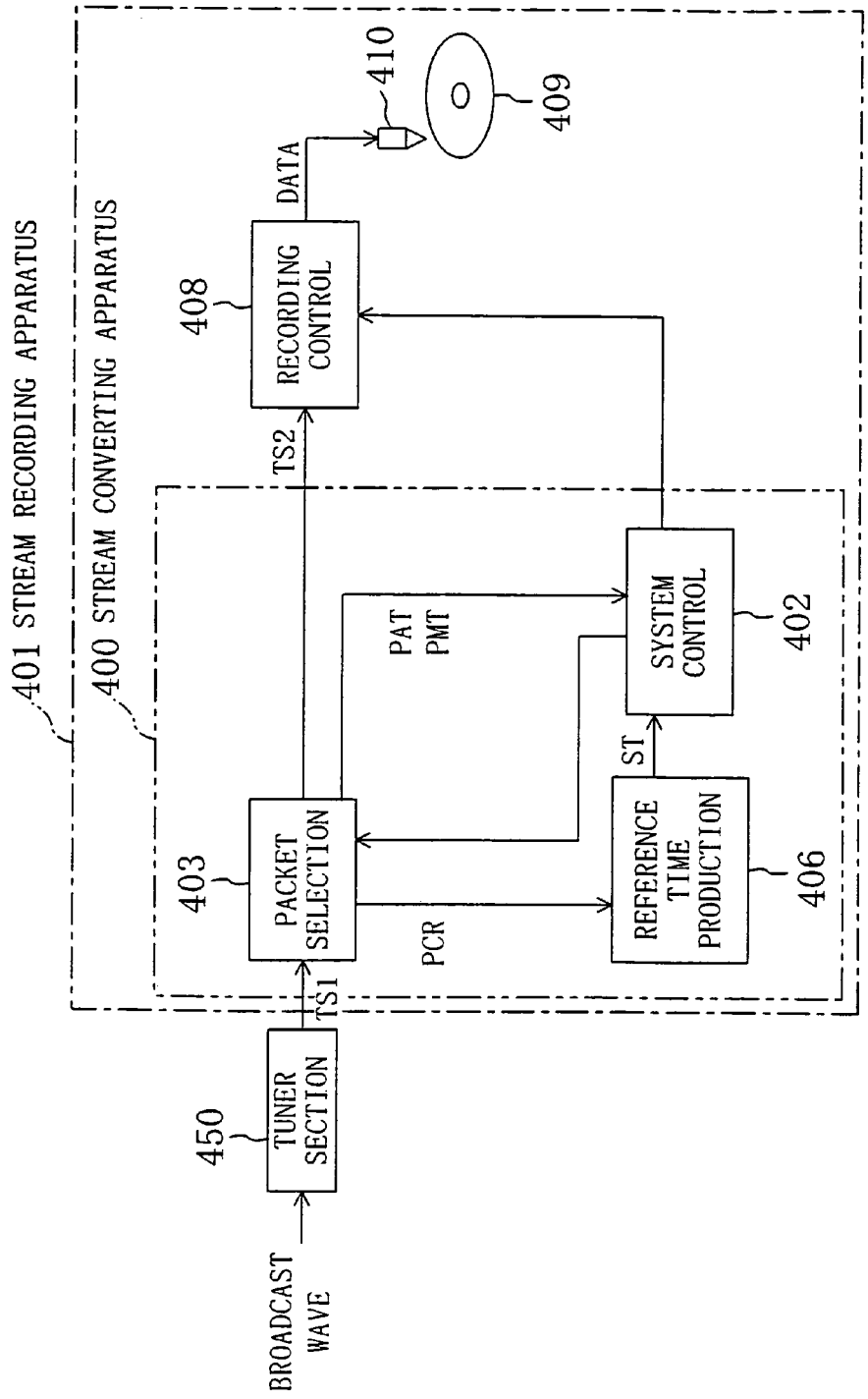
FIG. 5 is a block diagram showing the structure of a stream recording apparatus according to a second embodiment of the present invention.
Figure 7A:
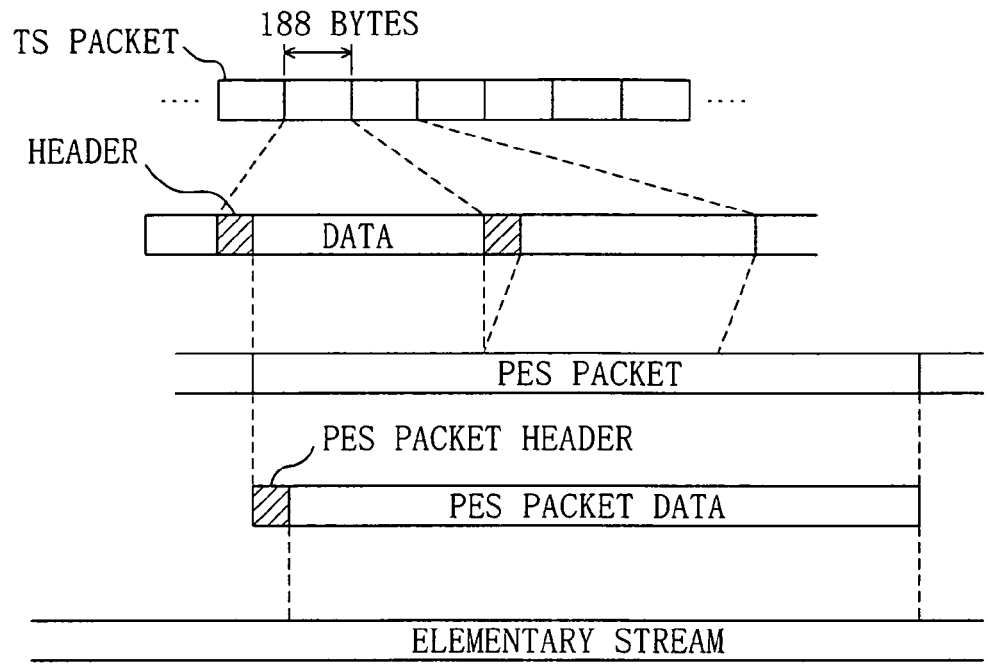
FIGS. 7A and 7B are diagrams showing a general structure of a transport stream.
Figure 7B:
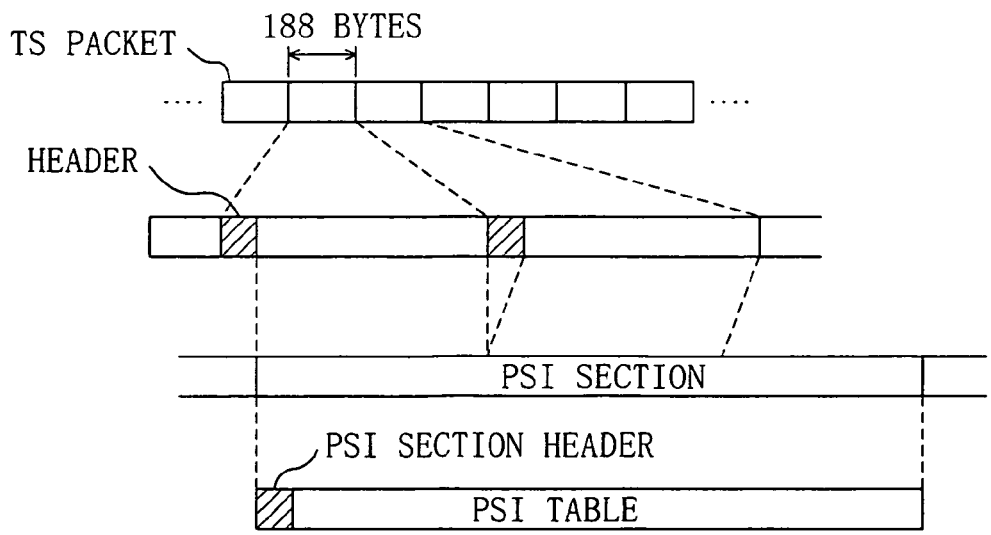

FIG. 5 is a block diagram showing the structure of a stream recording apparatus according to the second embodiment of the present invention. In FIG. 5, the stream recording apparatus 401 includes a stream converting apparatus 400, a recording control section 408 and an optical head 410, and records an input transport stream onto an optical disk 409 as a recording medium. The stream converting apparatus 400 converts an input first transport stream TS1 into a second transport stream TS2 by packet selection.

In the structure of FIG. 5, a tuner section 450 is connected to the input stage of the stream recording apparatus 401. A broadcast wave input to the tuner section 450 via an antenna or the like is subjected to processing in the tuner section 450 such as demodulation of a selected transmission carrier, and is output as a first transport stream TS1.

For simplification of the description, it is herein assumed that only a stream of a single program is included in the first transport stream TS1.

FIG. 6 is a schematic diagram illustrating the operation of the stream recording apparatus 401 shown in FIG. 5. Stream conversion and stream recording according to the present embodiment will now be described in conjunction with FIG. 6.

A packet selecting section 403 conducts generally three operations. The first operation is to extract PCR from the header of a TS packet. The extracted PCR as reference time information is output from the packet selecting section 403 to a reference time producing section 406. The reference time producing section 406 produces reference time ST using the PCR received from the packet selecting section 403. The produced reference time ST is output to a system control section 402.

The second operation of the packet selecting section 403 is to obtain PAT and PMT from the information of a program specific information (PSI) TS packet included in the first transport stream TS1. The PAT and PMT thus obtained are output from the packet selecting section 403 to the system control section 402.

The third operation of the packet selecting section 403 is to select and remove a specific type of TS packets from the input first transport stream TS1. In other words, TS packets other than those having a prescribed packet identifier are selected from the first transport stream TS1, and the selected TS packets are output as a second transport stream TS2.

It is herein assumed that packets of additional data (data for data broadcasting, text data, script and the like) are selected and removed from the first transport stream TS1.

FIGS. 6(a), (b) show the state of the packet selection as conducted herein. In the figures, (a) shows the first transport stream TS1, and (b) shows the second transport stream TS2. In FIGS. 6(a), (b), the abscissa indicates time, which herein refers to the reference time ST produced by the reference time producing section 406. Each rectangle represents a single TS packet, wherein a rectangle denoted with "P" represents a program specific information (PSI) TS packet, a rectangle with "V" represents a video TS packet, and a rectangle with "A" represents an audio TS packet. A rectangle without any character indicates an additional data TS packet to be removed herein. For the other TS packets as well, a TS packet having the same pattern represents a TS packet of the same type.

The system control section 402 designates the PID of additional data TS packets that is obtained from the PMT included in the system control section 402, and sends an instruction to the packet selecting section 403 to separate the additional data TS packets from the first transport stream TS1.

In response to this instruction, every time the packet selecting section 403 finds the header of a TS packet, it checks the PID of that TS packet. Then, if that PID matches the PID of the additional data TS packets that is designated by the system control section 402, the packet selecting section 403 separates that TS packet. In other words, the packet selecting section 403 separates the additional data TS packets from the first transport stream TS1 as shown in FIG. 6(a), and outputs the TS packets other than the additional data TS packets as shown in FIG. 6(b) as a second transport stream TS2.

The recording control section 408 receives as inputs the second transport stream TS2 output from the packet selecting section 403 and the reference time ST output from the system control section 402. Then, the recording control section 408 determines the time of receipt of each TS packet forming the second transport stream TS2, and records as record data DATA the second transport stream TS2 together with the determined time of receipt onto the optical disk 409 through the optical head 410. At this time, the empty portion in the second transport stream TS2 resulting from separation of the additional data TS packets is not recorded.

Thus, in the stream recording according to the present embodiment, TS packets having a prescribed program identifier (e.g., additional data TS packets) are separated from a transport stream received from broadcasting or the like so as to produce a TS packet string formed from the TS packets other than those having the prescribed program identifier. Then, the TS packet string thus produced is recorded onto a recording medium together with the time of receipt of the TS packet string.

Accordingly, a stream of digital broadcasting can be recorded for a long time even on a small-capacity medium, because the transport stream having its bit rate converted into a low bit rate is recorded. Moreover, in the case where the TS packets to be separated are the additional data TS packets, the separated data is not essential for reproduction of the stream, and therefore, the recorded stream is not rendered irreproducible upon watching the program. Moreover, since the stream is recorded together with the time of receipt of each TS packet, the TS packet string having the same timing as that upon recording can be output for reproduction.

Note that, although each of the above embodiments has been described for the case of converting and recording a transport stream received from broadcasting, a transport stream supplied from another input form, e.g., a digital interface, may alternatively be converted and recorded.

Moreover, although each of the above embodiments has been described for the case of using the optical disk as a recording medium, another recording medium such as a magnetic disk and a magnetic tape may alternatively be used.

What is claimed is:

1. A stream converting method, characterized in that it comprises the steps of:
    separating a first transport stream (TS) into a first TS packet string formed from TS packets that have a prescribed packet identifier and a second TS packet string formed from TS packets that do not have the prescribed packet identifier;
    extracting reference time information from the first transport stream so as to produce reference time from the reference time information;
    determining, with reference to the reference time, time of receipt of a TS packet including a head byte of a packetized elementary stream (PES) packet in the first TS packet string as first time of receipt;
    determining, with reference to the reference time, time of receipt of a head byte of each TS packet forming the second TS packet string as second time of receipt;
    converting a bit rate of the first TS packet string so as to produce a third TS packet string; and
    multiplexing the produced third TS packet string and the second TS packet string so as to produce a second transport stream,
    wherein in the packet multiplexing step, time of receipt of a TS packet including a head byte of a PES packet in the third TS packet string is made to match the first time of receipt, and time of receipt of a TS packet of the second TS packet string is made to match the second time of receipt.

2. The stream converting method according to claim 1, characterized in that it comprises the steps of:
    delaying the reference time by a prescribed time so as to produce delayed reference time,
    storing the second TS packet string, the second time of receipt, and the delayed reference time into a buffer, and
    outputting a TS packet corresponding to the second time of receipt from the buffer when the delayed reference time matches the second time of receipt.

3. The stream converting method according to claim 1, wherein in the packet multiplexing step, the second TS packet string is multiplexed preferentially over the third TS packet string.

4. The stream converting method according to claim 1, further comprising a step of determining the prescribed packet identifier,
    wherein in the identifier determining step, determining is performed based on a bit rate of the first transport stream.

5. A stream recording method, characterized in that it comprises the steps of:
    separating a first transport stream into a first TS packet string formed from TS packets that have a prescribed packet identifier and a second TS packet string formed from TS packets that do not have the prescribed packet identifier;
    extracting reference time information from the first transport stream so as to produce reference time from the reference time information;
    determining, with reference to the reference time, time of receipt of a TS packet including a head byte of a PES packet in the first TS packet string as first time of receipt;
    determining, with reference to the reference time, time of receipt of a head byte of each TS packet forming the second TS packet string as second time of receipt;
    converting a bit rate of the first TS packet string so as to produce a third TS packet string;
    multiplexing the produced third TS packet string and the second TS packet string so as to produce a second transport stream;
    extracting reference time information from the first transport stream, and delaying reference time represented by the reference time information by a prescribed time so as to produce delayed reference time; and
    determining, with reference to the delayed reference time, time of receipt of each TS packet forming the second transport stream, and recording the second transport stream together with the determined time of receipt onto a recording medium,
    wherein in the packet multiplexing step, time of receipt of a TS packet including a head byte of a PES packet in the third TS packet string is made to match the first time of receipt, and time of receipt of a TS packet of the second TS packet string is made to match the second time of receipt.

6. A stream converting apparatus, characterized in that it comprises:
    a packet separating section for separating a first transport stream into a first TS packet string formed from TS packets that have a prescribed packet identifier and a second TS packet string formed from TS packets that do not have the prescribed packet identifier;
    means for extracting reference time information from the first transport stream so as to produce reference time from the reference time information;
    means for determining, with reference to the reference time, time of receipt of a TS packet including a head byte of a PES packet in the first TS packet string as first time of receipt;
    means for determining, with reference to the reference time, time of receipt of a head byte of each TS packet forming the second TS packet string as second time of receipt;
    a bit-rate converting section for converting a bit rate of the first TS packet string so as to produce a third TS packet string; and a packet multiplexing section for multiplexing the third TS packet string output from the bit-rate converting section and the second TS packet string output from the packet separating section so as to produce a second transport stream, wherein the packet multiplexing section makes time of receipt of a TS packet including a head byte of a PES packet in the third TS packet string match the first time of receipt and makes time of receipt of a TS packet of the second TS packet string match the second time of receipt in multiplexing.

7. A stream recording apparatus, characterized in that it comprises:

a packet separating section for separating a first transport stream into a first TS packet string formed from TS packets that have a prescribed packet identifier and a second TS packet string formed from TS packets that do not have the prescribed packet identifier;

means for extracting reference time information from the first transport stream so as to produce reference time from the reference time information;

means for determining, with reference to the reference time, time of receipt of a TS packet including a head byte of a PES packet in the first TS packet string as first time of receipt;

means for determining, with reference to the reference time, time of receipt of a head byte of each TS packet forming the second TS packet string as second time of receipt;

a bit-rate converting section for converting a bit rate of the first TS packet string so as to produce a third TS packet string;

a packet multiplexing section for multiplexing the third TS packet string output from the bit-rate converting section and the second TS packet string output from the packet separating section so as to produce a second transport stream;

a means for delaying the reference time extracted based on the reference time information by a prescribed time so as to produce delayed reference time; and a recording control section for determining, with reference to the delayed reference time, time of receipt of each TS packet forming the second transport stream, and recording the second transport stream together with the determined time of receipt onto a recording medium, wherein the packet multiplexing section makes time of receipt of a TS packet including a head byte of a PES packet in the third TS packet string match the first time of receipt and makes time of receipt of a TS packet of the second TS packet string match the second time of receipt in multiplexing.

* * * * *